(12) United States Patent
Sinha et al.

(10) Patent No.: US 6,405,338 B1
(45) Date of Patent: Jun. 11, 2002

(54) UNEQUAL ERROR PROTECTION FOR PERCEPTUAL AUDIO CODERS

(75) Inventors: Deepen Sinha; Carl-Eric Wilhelm Sundberg, both of Chatham, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/022,114

(22) Filed: Feb. 11, 1998

(51) Int. Cl.[7] ............................................. H03M 13/00
(52) U.S. Cl. ..................... 714/752; 375/245; 375/253; 704/500; 704/501; 704/502; 704/503; 704/504; 714/755
(58) Field of Search ................................. 714/752, 751, 714/753, 746, 747, 748, 749, 750, 701, 795, 755, 776, 774, 790, 786; 381/22, 55, 56, 59; 700/94; 388/433; 704/500–504, 230, 200, 209, 222; 386/94; 380/201; 360/60, 51, 48; 375/260; 382/236, 232, 275; 348/426.1, 409.1, 473; 370/472, 480, 484

(56) References Cited

U.S. PATENT DOCUMENTS

| | | | | |
|---|---|---|---|---|
| 5,208,816 A | * | 5/1993 | Seshardi et al. | 714/795 |
| 5,289,501 A | * | 2/1994 | Seshadri et al. | 375/286 |
| 5,463,641 A | * | 10/1995 | Dorward et al. | 714/755 |
| 5,504,484 A | * | 4/1996 | Wilson | 341/67 |
| 5,544,328 A | * | 8/1996 | Seshadri | 375/261 |
| 5,570,350 A | * | 10/1996 | Myer et al. | 370/335 |
| 5,671,156 A | * | 9/1997 | Weerackody et al. | 714/52 |
| 5,682,463 A | * | 10/1997 | Allen et al. | 704/230 |
| 5,689,439 A | * | 11/1997 | Weerackody et al. | 370/329 |
| 5,717,764 A | * | 2/1998 | Johnston et al. | 381/2 |
| 5,771,102 A | * | 6/1998 | Vogt et al. | 358/433 |
| 5,781,561 A | * | 7/1998 | Machida et al. | 714/761 |
| 5,809,041 A | * | 9/1998 | Shikakura et al. | 714/747 |
| 5,825,807 A | * | 10/1998 | Kumar | 375/200 |
| 5,850,482 A | * | 12/1998 | Meany et al. | 382/232 |
| 5,870,405 A | * | 2/1999 | Hardwick et al. | 714/701 |
| 5,886,652 A | * | 3/1999 | Adachi et al. | 341/67 |
| 6,044,073 A | * | 3/2000 | Seshadri et al. | 370/342 |
| 6,064,662 A | * | 5/2000 | Gitlin et al. | 370/330 |
| 6,094,636 A | * | 7/2000 | Kim | 704/500 |
| 6,223,324 B1 | * | 4/2001 | Sinha et al. | 714/776 |

OTHER PUBLICATIONS

Kawabata, T (Speaker–independent speech recognition using nonlinear predictor codebooks; IEEE, Apr. 30, 1993).*

(List continued on next page.)

Primary Examiner—Albert Decady
Assistant Examiner—Gay Lamarre
(74) Attorney, Agent, or Firm—Ryan, Mason & Lewis

(57) ABSTRACT

An audio information bit stream including audio control bits and audio data bits is processed for transmission in a communication system. The audio data bits are first separated into n classes based on error sensitivity, that is, the impact of errors in particular audio data bits on perceived quality of an audio signal reconstructed from the transmission. Each of the n different classes of audio data bits is then provided with a corresponding one of n different levels of error protection, where n is greater than or equal to two. The invention thereby matches error protection for the audio data bits to source and channel error sensitivity. The audio control bits may be transmitted independently of the audio data bits, using an additional level of error protection higher than that used for any of the n classes of the audio data bits. Alternatively, the control bits may be combined with one of the n classes of audio data bits and provided with the highest of the n levels of error protection. Further protection may be provided for the control bits by repeating at least a portion of the control bits from a current packet of the audio information bit stream in a subsequent packet of the audio information bit stream. Moreover, the classification of audio data bits into n different classes can be implemented on a fixed packet-by-packet basis, or in a more flexible, adaptive implementation in which different multipacket error protection profiles are used for different multipacket segments of a source-coded audio signal.

35 Claims, 5 Drawing Sheets

OTHER PUBLICATIONS

Lightstone, M et al. (Locally optimal codebook design for quadtree–based vector quantization; IEEE, May 12, 1995).*

1. D. Sinha, J.D. Johnston, S. Dorward and S.R. Quackenbush, "The Perceptual Audio Coder," in Digital Audio, Section 42, pp. 42–1 to 42–18, CRC Press, 1998.

2. N.S. Jayant and E.Y. Chen, "Audio Compression: Technology and Applications," AT&T Technical Journal, pp. 23–34, vol. 74, No. 2, Mar.–Apr. 1995.

3. J. Hagenauer, "Rate Compatible Punctured Convolutional Codes (RCPC Codes) and their Applications," IEEE Transactions on Communications, vol. 36, No. 4, pp. 389–400, Apr. 1988.

4. J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

5. R.V. Cox et al., "Sub–band Speech Coding and Matched Convolutional Channel Coding for Mobile Radio Channels," IEEE Transactions on Acoustics, Speech and Signal Processsing, vol. 39, No. 8, pp. 1717–1731, Aug. 1991.

6. A.R. Calderbank and N. Seshadri, "Multilevel Codes for Unequal Error Protection," IEEE Transactions on Information Theory, vol. 39, No. 4, pp. 1234–1248, Jul. 1993.

7. C.–E.W. Sundberg, "Digital Audio Broadcasting in the FM Band, " Proceedings of the IEEE Symposium on Industrial Electronics, Portugal, Jul. 7–11, 1997.

8. C.–E.W. Sundberg, "Digital Audio Broadcasting: An Overview of Some Recent Activities in the U.S.," Proceedings of Norsig–97, Norwegian Signal Processing Symposium, Tromso, Norway, May 23–24, 1997.

Cox et al. Subband Speech Coding and Matched Conv. Channel Cod. for Radio Chan., IEEE, 1991.*

Kim et al. (Bit Rate Reduction Algorithm for a Digital VCR. IEEE, Jun. 1991.).*

T. Ritthongpitak et al., "Optimal Two–Level Unequal Error Control Codes for Computer Systems," IEEE Proceedings of FTCS–26, pp. 190–199, 1996.

X. Lin et al., "Subband–Multipulse Digital Audio Broadcasting for Mobile Receivers," IEEE Transactions on Broadcasting, vol. 39, No. 4, pp. 373–382, 1993.

* cited by examiner

UNEQUAL ERROR PROTECTION FOR PERCEPTUAL AUDIO CODERS

FIELD OF THE INVENTION

The present invention relates generally to audio coding devices, and more particularly to techniques for providing unequal error protection (UEP) for different classes of bits encoded in a perceptual audio coder (PAC) or other audio source coding device.

BACKGROUND OF THE INVENTION

Most source coded bit streams exhibit unequal sensitivity to bit errors. For example, certain source bits can be much more sensitive to transmission errors than others. Moreover, errors in certain bits, such as control bits, may lead to severe error propagation and a corresponding degradation in reconstructed signal quality. Such error propagation can occur, for example, in the output audio bits of an audio coder due to the use of control bits for codebook information, frame size information, synchronization information and so on. The perceptual audio coder (PAC) described in D. Sinha, J. D. Johnston, S. Dorward and S. R. Quackenbush, "The Perceptual Audio Coder," in Digital Audio, Section 42, pp. 42-1 to 42-18, CRC Press, 1998, which is incorporated by reference herein, attempts to minimize the bit rate requirements for the storage and/or transmission of digital audio data by the application of sophisticated hearing models and signal processing techniques. In the absence of channel errors, a PAC is able to achieve near stereo compact disk (CD) audio quality at a rate of approximately 128 kbps. At a lower bit rate of 96 kbps, the resulting quality is still fairly close to that of CD audio for many important types of audio material.

The rate of 96 kbps is particularly attractive for FM band transmission applications such as in-band digital audio broadcasting (DAB) systems, which are also known as hybrid in-band on-channel (HIBOC), all-digital IBOC and in-band adjacent channel (IBAC)/in-band reserve channel (IBRC) DAB systems. There is also a similar effort underway to provide digital audio broadcasting at lower audio bit rates in the AM band. For these AM systems, audio bit rates of about 32 to 48 kbps are being considered for daytime transmission and about 16 kbps for nighttime transmission. Higher audio bit rates, greater than about 128 kbps, are being used in multiple channel DAB systems. The transmission channels in the above-noted DAB systems tend to be severely bandlimited and noise limited at the edge of a coverage area. For mobile receivers, fading is also a severe problem. It is therefore particularly important in these and other applications to design an error protection technique that is closely matched to the error sensitivity of the various bits in the compressed audio bit stream.

PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel). Different portions of a given packet can therefore exhibit varying sensitivity to transmission errors. For example, corrupted control information leads to loss of synchronization and possible propagation of errors. On the other hand, the spectral components contain certain interframe and/or interchannel redundancy which can be exploited in an error mitigation algorithm incorporated in a PAC codec. Even in the absence of such redundancy, the transmission errors in different audio components have varying perceptual implications. For example, loss of stereo separation is far less annoying to a listener than spectral distortion in the mid-frequency range in the center channel.

Unequal error protection (UEP) techniques are designed to match error protection capability with sensitivity to transmission errors, such that the most important bits are provided with the highest level of error protection, while less important bits are provided with a lesser level or levels of error protection. A conventional two-level UEP technique for use in DAB applications is described in N. S. Jayant and E. Y. Chen, "Audio Compression: Technology and Applications," AT&T Technical Journal, pp. 23–34, Vol. 74, No. 2, March–April 1995. In this technique, which is based on a Reed-Solomon (RS) code, the control information is protected more robustly since it is not possible to use error mitigation on the non-redundant control information. In fact, the proper operation of the error mitigation algorithm used in a PAC codec is itself dependent upon reliable control information. All of the non-control spectral information in this technique is protected using a uniform level of error protection.

SUMMARY OF THE INVENTION

We have realized that a significant problem with the above-described unequal error protection (UEP) technique and other conventional UEP techniques is that these techniques fail to exploit the unequal impact on perceived audio quality of transmission errors in various spectral components. Moreover, the conventional techniques are often not directly applicable to a wide variety of bit rates and to transmission channels other than radio broadcasting channels.

The present invention provides methods and apparatus for implementing UEP in a source coded bit stream such as that generated by a perceptual audio coder (PAC). In an illustrative embodiment, an audio information bit stream includes audio control bits and audio data bits. The data bits are first separated into n different classes of bits, where n is greater than or equal to two, based on the sensitivity of the bits to source and channel errors. Each of the n different classes of data bits is then encoded in accordance with a corresponding one of n different levels of error protection. The invention thus separates audio data bits into classes based on the impact of errors in the data bits on perceived quality of an audio signal reconstructed from the transmitted encoded audio, and matches the error protection provided for the audio data bits to error sensitivity. For example, the data bits may be separated such that data bits corresponding to a side audio channel are assigned to a class which receives a lower level of error protection than data bits corresponding to a center audio channel. As another example, data bits corresponding to designated frequency range, such as 100 Hz to 4 kHz, may be assigned to a class which receives a higher level of error protection than data bits corresponding to another frequency range.

The audio control bits may be encoded independently of the audio data bits, using an additional level of error protection higher than that used for any of the n classes of the data bits. Alternatively, the control bits may be combined with one of the n classes of bits and encoded in accordance with the highest level of error protection of the n levels. Further protection may be provided for the control bits by repeating at least a portion of the control bits from a current packet in the audio bit stream in a subsequent packet of the audio bit stream. The UEP techniques of the invention may be designed to provide the same total bit rate as an equal error protection (EEP) technique.

The invention is applicable not only to PACs but also to other types of audio compression techniques operating over a wide range of bit rates, and can be used with transmission channels other than radio broadcasting. The above-described classification of data bits into n different classes can be implemented on a fixed packet-by-packet basis, or in a more flexible, adaptive implementation in which different multipacket error protection profiles are used for different multipacket segments of a source-coded audio signal. The invention can be implemented with a variety of different types of codes, including Reed-Solomon codes and rate-compatible punctured convolutional (RCPC) codes, as well as other types of block and convolutional codes. Moreover, the invention could use other techniques to provide different levels of error protection for different classes of bits, including, for example, coded modulation, higher level modem constellations and different transmission power levels, as well as other well-known techniques for implementing UEP. Communication systems with UEP in accordance with the invention exhibit a more graceful degradation in the presence of channel errors, as well as an extended operating range, relative to systems with conventional UEP or EEP systems.

DETAILED DESCRIPTION OF THE INVENTION

The invention will be described below in conjunction with exemplary unequal error protection (UEP) techniques for use with a perceptual audio coder (PAC) such as that described in D. Sinha, J. D. Johnston, S. Dorward and S. R. Quackenbush, "The Perceptual Audio Coder," in Digital Audio, Section 42, pp. 42-1 to 42-18, CRC Press, 1998. It should be understood, however, that the UEP techniques of the invention may be applied to many other types of audio coding devices. In addition, the invention may be utilized with a wide variety of different types of audio communication channels, including the Internet, cellular multimedia channels, satellite channels, wireless cable, wireless local loop, high-speed wireless access and the like. Although illustrated in a system in which different codes are used to provide different levels of error protection, any of a number of alternative techniques can be used to provide unequal error protection for different classes of bits in accordance with the invention. These alternative techniques include, for example, coded modulation techniques, higher level modem constellations and different transmission power levels.

Figure 1:
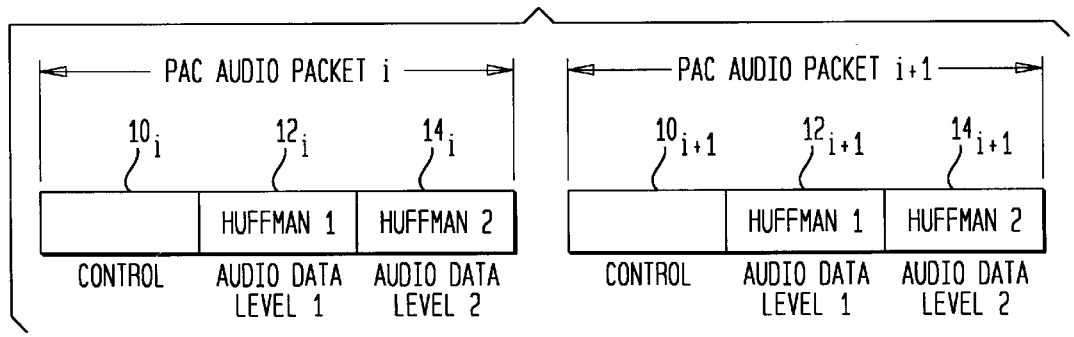
FIG. 1 shows a simplified packet format for a bit stream generated by a perceptual audio coder (PAC).

FIG. 1 illustrates an exemplary three-level UEP coding technique in accordance with the invention. First and second PAC audio packets i and i+1 are shown in FIG. 1. The first PAC audio packet i includes a control bit portion $10_i$, a level 1 audio data bit portion $12_i$ and a level 2 audio data bit portion $14_i$. The second PAC audio packet i+1 includes a control bit portion $10_{i+1}$, a level 1 audio data bit portion $12_{i+1}$ and a level 2 audio data bit portion $14_{i+1}$. The audio data portions are source encoded using Huffman codes. All other PAC packets in a given audio information bit stream will be assumed to be arranged in the same manner. The control information in the control portions of the PAC audio packets generally represents a relatively small portion of the overall bitstream, and normally incorporates no redundancy. As will be described in greater detail below, the control information may be provided with a higher level of error protection in part by repeating the control information from one packet in one or more other packets.

The exemplary three-level UEP coding technique illustrated in FIG. 1 utilizes a first code for the control portions of the PAC audio packets (i.e., class 1 bits), a second code for the level 1 audio data portions (i.e., class 2 bits), and a third code for the level 2 audio data portions (i.e., class 3 bits). The class 1 bits are the most important bits and are therefore protected with a low-rate (i.e., high redundancy) code, while the class 2 and class 3 bits are of increasingly lesser importance and are therefore protected with increasingly higher-rate (i.e., lower redundancy) codes. In the illustrative embodiment of FIG. 1, the control information is thus treated separately from the audio information, and is provided with the highest level of error protection, while the audio data is separated into two distinct classes of bits, each of which is provided with a different level of error protection.

The relative allocation of audio bits into one of the two audio data classes 2 and 3 and the corresponding rates of the respective second and third error protection codes are collectively referred to as the error protection profile of the UEP technique. Error protection profiles in accordance with the invention may be constrained to ensure that the overall bit rate is substantially equivalent to that provided by a conventional equal error protection (EEP) technique. In one possible implementation of the above-described three-level UEP technique, the second and third codes may be fixed-rate error protection codes. This will generally mean that the resulting UEP technique can provide substantially the same average source and channel rates as a corresponding conventional EEP technique. In addition, the relative allocation of audio data bits between the second and third classes may be the same for all packets.

Figure 2:
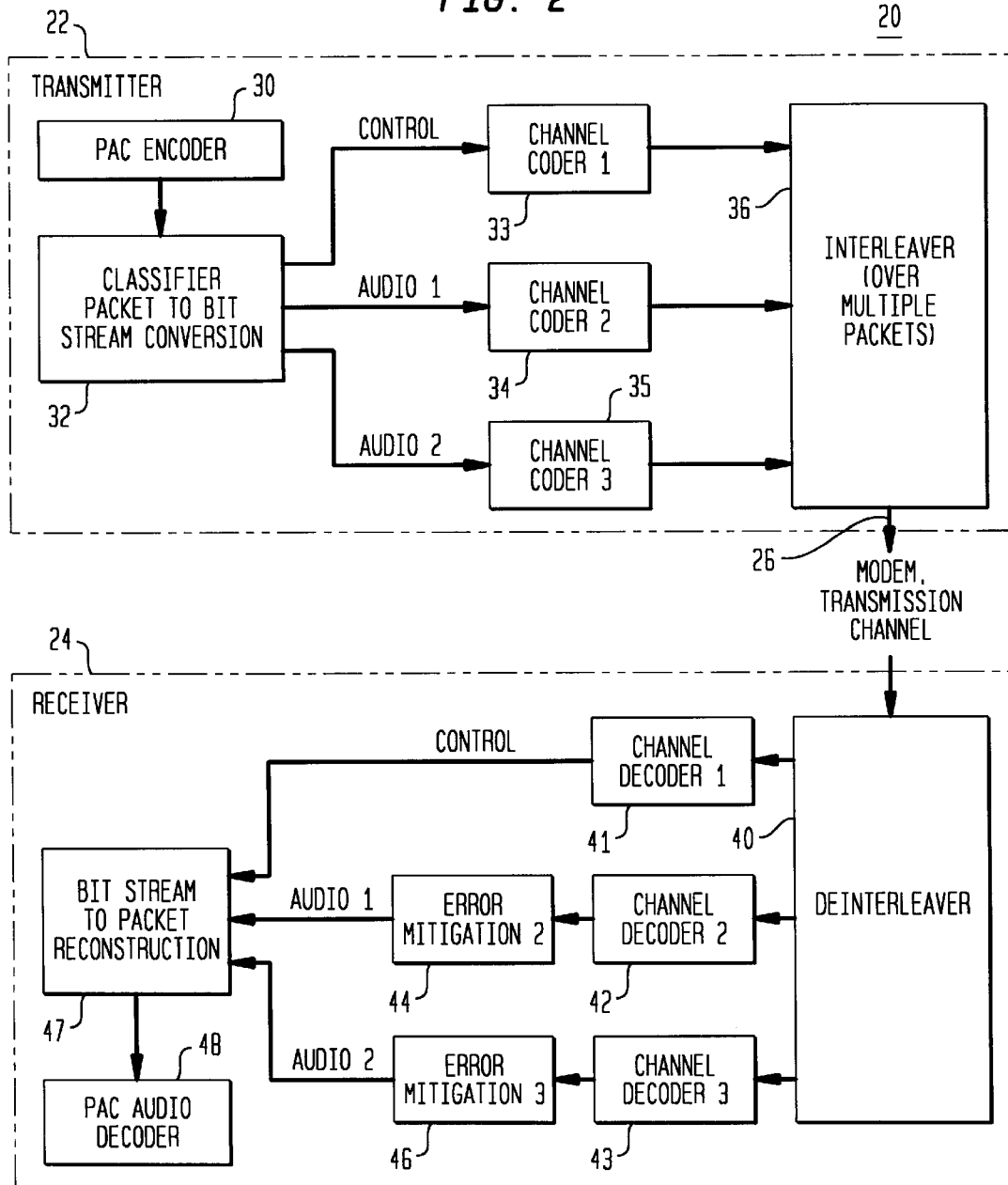
FIG. 2 is a block diagram of a communication system which implements three-level unequal error protection (UEP) in accordance with the invention.

FIG. 2 is a block diagram of an exemplary communication system 20 which implements the above-described three-level UEP technique in accordance with the invention. The system 20 includes a transmitter 22 and a receiver 24 which communicate over a transmission channel 26. The transmitter 22 includes a PAC encoder 30 for generating a sequence of PAC audio packets from an analog audio signal. Although this embodiment uses PAC audio packets, the invention is more generally applicable to audio information generated by any type of audio compression technique. The audio packets from PAC encoder 30 are applied to a classifier 32 which converts the packets into separate bit streams corresponding to control information, level 1 audio data bits and level 2 audio data bits. The control information bit stream is supplied to a first channel coder 33, the level 1 audio data bit stream is supplied to a second channel coder 34, and the level 2 audio data bit stream is supplied to a third channel coder 35, as shown in FIG. 2. The symbol outputs of the channel coders 33, 34 and 35 are supplied to an interleaver 36 which provides interleaving of the symbols over multiple PAC packets. The transmitter 22 may include additional processing elements, such as a modulator, a multiplexer, an upconverter and the like, which are not shown in FIG. 2 for simplicity of illustration. For example, the output of the interleaver 36 may be modulated onto one or more subcarriers, and the sub-carriers frequency modulated onto a radio frequency (RF) carrier for transmission to the receiver 24. As another example, the output of the interleaver 36 may be applied to a modem for modulation onto carriers for transmission over a telephone line or other network connection.

The receiver 24 receives the transmitted signal from the transmission channel 26, and processes it to recover the interleaved symbols. The symbols are deinterleaved in a deinterleaver 40, and then applied to first, second and third channel decoders 41, 42 and 43, respectively, as shown in FIG. 2. The bit stream at the output of the first decoder 41 corresponds to the control information, the bit stream at the output of the second decoder 42 corresponds to the level 1 audio data bit stream, and the bit stream at the output of the third decoder 43 corresponds to the level 2 audio data bit stream. The audio data bit streams are then processed in respective error mitigation units 44, 46, and the resulting processed audio data bit streams are applied with the control information bit stream from decoder 41 to a reconstruction unit 47. The reconstruction unit 47 processes the three bit streams applied thereto to reconstruct PAC packets of the type shown in FIG. 1. The resulting sequence of PAC packets are then decoded in a PAC audio decoder 48 to reconstruct the original analog audio signal.

Like the transmitter 22, the receiver 24 may include additional processing elements which are not shown in FIG. 2. It should also be noted that various elements of the system 20, such as the interleaver 36 and the deinterleaver 40, may be eliminated in alternative embodiments. Moreover, various elements of the system 20, such as the audio encoder and decoder, the channel coders and decoders, the classifier and reconstruction unit, and the error mitigation units, may be implemented using portions of an application-specific integrated circuit, microprocessor or any other type of digital data processor. Various aspects of the invention may also be implemented in the form of one or more software programs executed by a central processing unit (CPU) or the like in the digital data processor.

A simplified two-level version of the three-level UEP technique described in conjunction with FIGS. 1 and 2 combines the control information of class 1 with the level 1 audio data of class 2 to form a new class, referred to as class 1*, which is protected by a single error protection code. The subset of class 1* which corresponds to the control information of original class 1 may be further protected using the above-noted inter-packet repeat feature. For example, the control information for a current PAC packet may be included in both the current packet and the next packet. The error correction capability of an embodiment with this type of repeat code may be further enhanced by the use of an interleaver which operates on the coded bitstream to ensure that the repeated control information is well separated in time from the original control information. The simplified two-level version of the UEP technique may be viewed as operating on a two-class partitioned bit stream in which each packet is effectively partitioned into two classes: the above-defined class 1* and a class 2* which corresponds to the original class 3. Suitable channel codes for use with class 1* and class 2* will be described in greater detail below.

The quantization model used in a PAC encoder is essentially an adaptive subband coding scheme. An analog audio signal is typically processed in the encoder by a time-varying filter bank. The output from the filter bank is partitioned into groups or "coder bands" such that each coder band has a single quantizer step size or "scale factor" associated with it. This partitioning is based on a "critical band" division of the audio frequency range. Critical bands are ranges of frequency over which the ear tends to integrate audio stimuli. Usually there are one or more coder bands associated with each critical band which indicate finer partitioning of the critical band audio information in frequency (i.e., if a high frequency resolution filter bank is employed) or in time (i.e., if a higher time resolution filter bank is employed). The scale factors associated with the coder bands are generated in each audio frame using a perceptual masking model. The scale factors and the quantized coder band components are further compressed using an adaptive Huffman coding scheme. Usually one of several possible Huffman codebooks may be selected for a given group of coder bands. As previously noted, the use of Huffman coding can cause transmission errors to be propagated within an audio frame.

Figure 3:
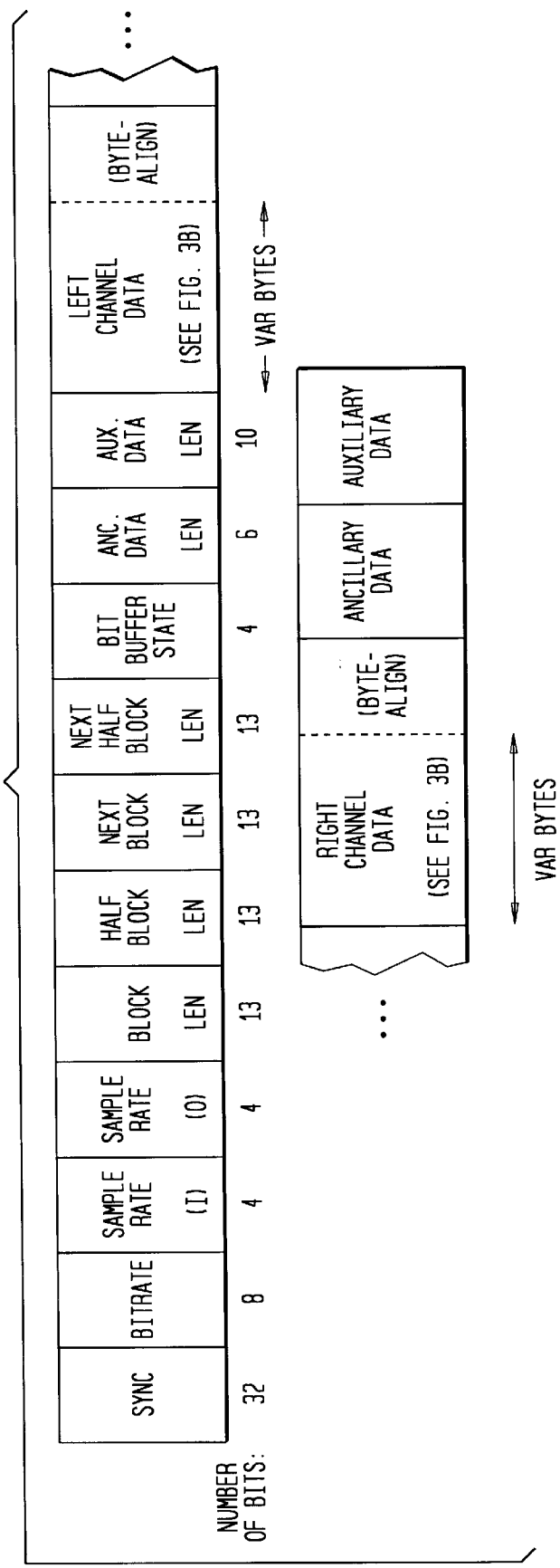
FIGS. 3A and 3B illustrate further details of the PAC packet format of FIG. 1.

FIGS. 3A and 3B illustrate an exemplary PAC packet in greater detail. FIG. 3A shows the format of a single exemplary packet, while FIG. 3B shows the format of a left channel or right channel data portion of the packet of FIG. 3A. PAC coding utilizes a block processing algorithm and each PAC packet corresponds to 1024 input samples from each audio channel, regardless of the actual number of audio channels. Each packet contains the Huffman-encoded filter bank outputs, codebook sections, quantizers and channel combination information for one 1024-sample chunk or eight 128-sample chunks. The packet size is variable, such that packets corresponding to different sets of 1024 input samples can have different sizes. Depending on the application, various types of additional control information are added to a first packet or to every packet. For example, when storing information on a reliable medium, such as a hard disk, a header indicating version, sample rate, number of channels, and encoded rate is placed at the beginning of the compressed music. For potentially unreliable transmission channels, such as those used in digital audio broadcasting, a header is generally added to each packet. This header can contains control information such as synchronization, error recovery, sample rate, number of audio channels, and the transmission bit rate.

In the exemplary PAC packet of FIG. 3A, a header portion of the packet includes a 32-bit sync, an 8-bit bitrate indicator, 4-bit I and O sample rate indicators, 13-bit block length, half block length, next block length and next half block length indicators, a 4-bit buffer state indicator, a 6-bit ancillary data length indicator, and a 10-bit auxiliary data length indicator. This header is followed by a variable length left channel data portion, a variable length right channel data portion, and variable length ancillary and auxiliary data portions. FIG. 3B shows that the left or right channel data portions may include sectioning information (e.g., number of sections, section boundaries and codebooks), scale factors and coefficients. Additional details regarding the PAC packet format shown in FIGS. 3A and 3B can be found in the above-cited PAC reference and the format will therefore not be further described herein.

The process of classifying a PAC audio bitstream into unequal error sensitivity classes will now be described in greater detail. In the simplified two-level version of the three-level embodiment described in conjunction with FIGS. 1 and 2 above, the relative sizes of class 1* and class 2* may be maintained substantially constant from packet to packet, i.e., a fixed P% of bits in each packet are classified as critical. The operating characteristics of the classifier which allocates bits to the two classes, together with the parameter P, determine the relative rates of the two classes, and may be selected based on perceptual masking principles and subjective quality measurements. Two illustrative perceptual masking principles which may be used in the classifier are as follows: (1) the stereo separation of the signal, i.e., side channels are deemed to be perceptually less significant than the center channel; and (ii) a group of coder bands which correspond to a frequency range or set of frequency ranges which have been determined to be perceptually more critical to the quality of the reconstructed audio. Typically, the low to mid frequency coder bands, corresponding generally to the frequency range of about 100 Hz to 4 kHz, are more critical than the rest of the spectral information in the audio bitstream. Experiments indicate that a relatively large value of P is often desirable, due to the fact that a relatively large number of bits are consumed by the low to mid frequency coder bands (as much as 60–70% for certain packets). In many applications, a value of P of about 50% will be acceptable for use.

The operation of a classifier configured to utilize the above principles will now be described. For each packet with a size K bits, a "bit bucket" of size P*K/100 is created. The bit bucket is then filled with bits from the packet by applying a sequence of perceptually-driven selection rules. First, the control information is placed in the bucket. Next, the spectral information corresponding to the frequency range 100 Hz to 2.5 kHz for the monophonic or center channel is placed in the bucket. For coder bands utilizing Left/Right coding, bits for both the left and right channels are placed in the bucket, but for coder bands utilizing Sum/Diff coding, only the sum bits are included in the bucket. Next, all or part of the monophonic or center channel information corresponding to the frequency range 2.5 kHz to 4 kHz goes into the bucket. Since it is often not possible to incorporate all of these bits into the bucket, a sub-critical band comb may be applied to the spectral bits to select certain pairs of these bits for placement in the bucket. If the bucket is still not full after application of the band comb, bits are chosen for inclusion in the bucket in the following order: (1) difference channel bits in the 100 Hz to 4 kHz range, (2) channel bits in the 0 to 100 Hz range, (3) monophonic or center channel bits in the 4 to 8 kHz range, (4) difference channel bits in the 4 to 8 kHz range, and (5) higher frequency spectral information greater than 8 kHz.

The bits which are placed in the above-described bit bucket are the class 1* bits, and therefore represent the more critical audio information which is provided with a higher level of error protection. The remainder of the bits in the audio packet form the class 2* bits for the packet and are provided with a lower level of error protection. Specific channel codes suitable for use with these two classes of bits will be described in greater detail below. The different levels of error protection are generally selected such that overall distortion in the quality of the reconstructed audio is minimized. This determination can be made subjectively, by listening to the impact of simulated errors and adjusting the error protection levels accordingly. Objective distortion criteria could also be used but may in some cases produce suboptimal results.

Figure 4:
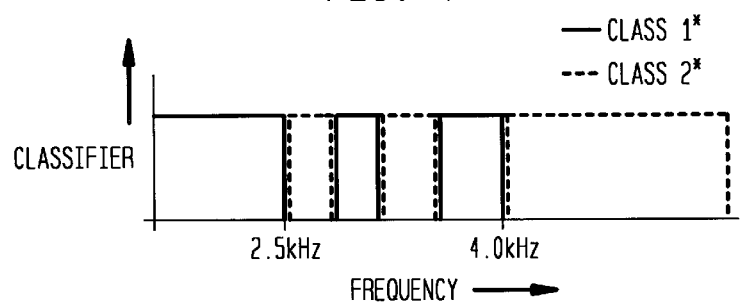
FIG. 4 shows a classification strategy for monophonic spectral information for use in classifying audio bits for the purpose of providing multi-level UEP in accordance with the invention.

FIG. 4 illustrates the operation of the classifier for monophonic or center channel spectral information in one possible implementation. The classifier for the center channel spectral information is shown as a frequency plot designating which frequency ranges are assigned to class 1* (shown by a solid line) and which are assigned to class 2* (shown by a dashed line). Other embodiments of the invention can of course utilize other types of classifiers.

The above-described three-level UEP technique can also be extended to provide more sophisticated types of protection. For example, the audio data may be classified into more than two classes of error sensitivity, with the respective sizes and code rates of the classes adjusted appropriately. The error protection profile may still be made constant from packet to packet. Such further subclassification of the two classes of audio data may be used to better exploit the error mitigation algorithms. For example, PAC uses an interpolative error mitigation algorithm in which information from past and future audio packets is utilized to generate any missing packets. Some parts of the spectral audio description used in PAC yield better interpolation than others and this fact may be utilized to classify the information in different error protection classes.

Figure 5:
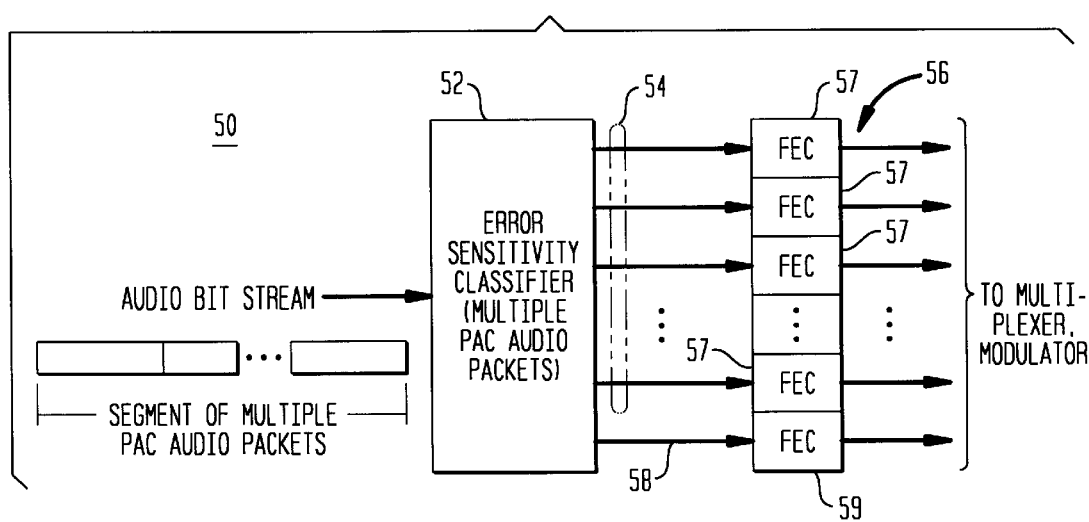
FIG. 5 illustrates one possible implementation of a multipacket error protection profile technique in accordance with the invention.

FIG. 5 illustrates another possible extension of the above-described UEP techniques. This extension utilizes a multi-band audio signal loudness profile over a multiple audio frame duration to determine an appropriate multipacket error protection profile for the corresponding group of multiple PAC audio packets. This profile, which may be selected from a finite number of possible profiles, will then be transmitted as part of the forward control information to the receiver. FIG. 5 shows a portion of a transmitter 50 in which a source-coded audio information bit stream is applied to an error sensitivity classifier 52. The classifier 52 operates on a segment of multiple PAC packets as shown. Each of the PAC packets in the multipacket segment corresponds to a single audio frame. The classifier 52 separates the audio data bits in each of the packets of the multipacket segment into n different classes of audio data bits based on error sensitivity, in a manner similar to that previously described. The audio data bits from each of these classes are supplied via lines 54 to an encoder 56 which includes individual forward error correction (FEC) encoders 57 for each of the classes of audio data bits. Each of the individual encoders 57 provides a different level of error protection for the class of audio data bits applied thereto. The control bits from the audio bit stream may be combined with the most error sensitive class of the audio data bits and delivered via one of the lines 54 to one of the encoders 57. Alternatively, a separate one of the lines 54 and encoders 57 may be used to encode the control bits.

An identifier of the particular error protection profile selected for the multipacket segment is supplied from the classifier 52 via line 58 to another encoder 59. This identifier specifies the particular error protection profile utilized for the corresponding multipacket segment, and is therefore protected with a relatively high level of error protection. The transmitter 50 can thus be used to select a different UEP profile for different multipacket segments of an audio information bit stream, such that the selected profile may be varied in accordance with the characteristics of the audio signal. In an alternative embodiment, the control bits from the input audio bit stream may be combined with the UEP profile identifier and coded by the encoder 59, rather than being combined with one of the classes of audio data bits or separately applied to one of the individual encoders 57. The outputs of the individual encoders 57, 59 of encoder 56 are applied to a multiplexer, modulator or other device for further processing prior to transmission.

The use of a multipacket error protection profile as described in conjunction with FIG. 5 is particularly attractive for PAC applications operating at lower bit rates and lower audio bandwidths. For example, a 32 kbps PAC output attempts to code only 7–8 kHz of audio bandwidth. In this case, a majority of output bits in several packets may correspond to critical audio information and a 50—50 split between two classes for each packet may not yield any significant quality advantage. On the other hand, a multipacket error protection profile will be able to exploit the variability in the bit demand as well as the interpolative capabilities of the PAC error mitigation algorithm to classify a suitable multipacket subset of the critical information as a separate class. Protecting this multipacket critical class with a stronger level of error protection is then likely to provide improved performance relative to a UEP technique which attempts to separate packets into classes of bits using an identical profile for every packet.

Another application in which a multipacket error protection profile can be particularly useful is in high fidelity reproduction of onsets in an audio signal. This is an important quality criterion for an audio compression/transmission scheme. Such onsets, although infrequent, require a large number of bits for encoding. Furthermore, for onsets, higher frequency audio components should be classified as critical as well. It is therefore apparent that for a PAC audio packet containing an onset, a simple partition into two equal-size classes in accordance with a single-packet error profile may not provide optimal results. On the other hand, a multipacket error profile may be configured to allow most of the bits from an onset PAC packet to be classified as critical. Although this will generally imply that fewer bits from other packets in the same multipacket segment can be classified as critical, there may be less demanding audio packets in the segment which can benefit from other features such as interpolation.

Figure 6A:
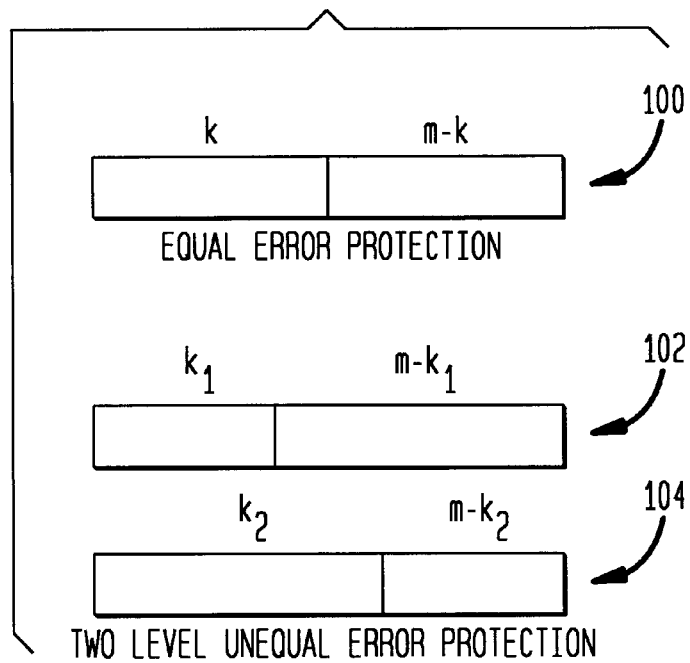
FIGS. 6A and 6B illustrate techniques for implementing two-level UEP using a fixed block length and a fixed information word length, respectively, in accordance with the invention.
Figure 6B:
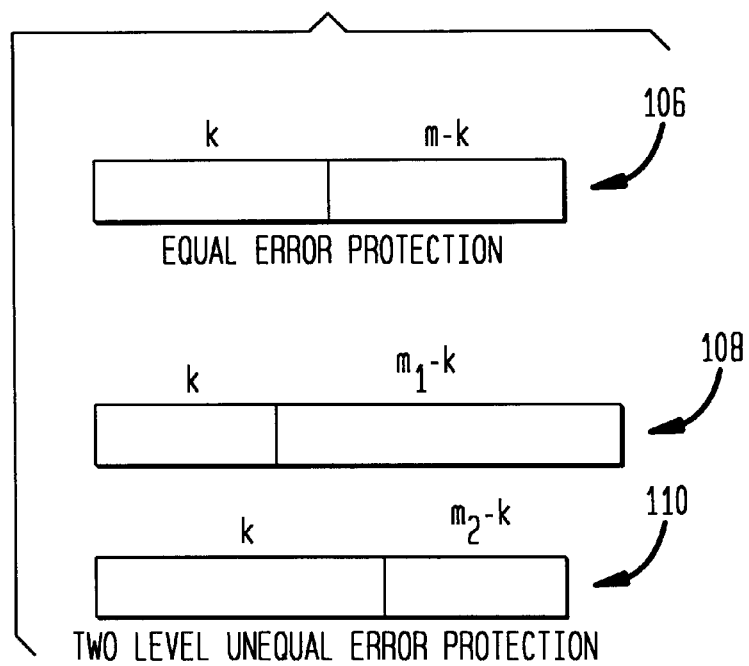

FIGS. 6A and 6B illustrate two possible techniques of employing block codes to provide two-level UEP in accordance with the invention. The block codes may be, for example, Reed-Solomon codes, as described in greater detail in S. Lin and D. J. Costello Jr., "Error Control Coding: Fundamentals and Applications," Prentice-Hall, 1983, which is incorporated by reference herein. In this case, two different Reed-Solomon codes may be used to provide two levels of error protection, with the average rate of the two codes equivalent to the rate which would be used to provide EEP for both classes. FIG. 6A illustrates an implementation which utilizes code words of a fixed length m. A codeword 100 configured to provide EEP for two different classes includes a first portion of length k and a second portion of length m-k, where k is the number of information symbols. An exemplary pair of codewords 102 and 104 are configured in accordance with a two-level UEP technique such as that described previously. Codeword 102 includes a first portion of length $k_1$ and a second portion of length $m-k_1$, while codeword 104 has a first portion of length $k_2$, and a second portion of length $m-k_2$. In this example, the number of information symbols $k_1$ in codeword 102 is less than m, while the number of information symbols $k_2$ in codeword 104 is greater than m.

FIG. 6B illustrates an implementation which utilizes variable length code words but a fixed number of information symbols k. A codeword 106 configured to provide EEP for two different classes of bits includes a first portion of length k and a second portion of length m-k, as in the codeword 100 of FIG. 6A. FIG. 6B also shows an exemplary pair of codewords 108 and 110 configured in accordance with a two-level UEP technique. Codeword 108 includes a first portion of length k and a second portion of length $m_1-k$, while codeword 110 has a first portion of length k, and a second portion of length $m_2-k$. In this example, the length $m_1$ of codeword 108 is greater than k, while the length $m_2$ of codeword 110 is less than k. Shortened forms may be used for the Reed-Solomon codes in this embodiment. Interleaving should be performed at the code symbol level. In an embodiment using Reed-Solomon codes, an error detection flag for use in error mitigation can be obtained automatically from a decoder.

Other types of codes could also be used to provide multi-level UEP in accordance with the invention, including convolutional codes, as described in, for example, the above-cited S. Lin and D. J. Costello Jr. reference, and G. C. Clark, Jr. and J. B. Cain, "Error Correcting Codes for Digital Communications," Plenum Press, 1981, which is also incorporated by reference herein. A particularly efficient and flexible technique for achieving multi-level UEP with convolutional codes is through the use of rate-compatible punctured convolutional (RCPC) codes, as described in, for example, J. Hagenauer, "Rate Compatible Punctured Convolutional Codes (RCPC Codes) and their Applications," IEEE Transactions on Communications, Vol. 36, No. 4, pp. 389–400, April 1988, J. Hagenauer et al., "The Performance of Rate Compatible Punctured Convolutional Codes for Digital Mobile Radio," IEEE Transactions on Communications, Vol. 38, No. 7, pp.966–980, July 1990, and R. V. Cox et al., "Sub-band Speech Coding and Matched Convolutional Channel Coding for Mobile Radio Channels," IEEE Transactions on Acoustics, Speech and Signal Processing, Vol. 39, No. 8, pp. 1717–1731, August 1991, all of which are incorporated by reference herein.

Figure 7:
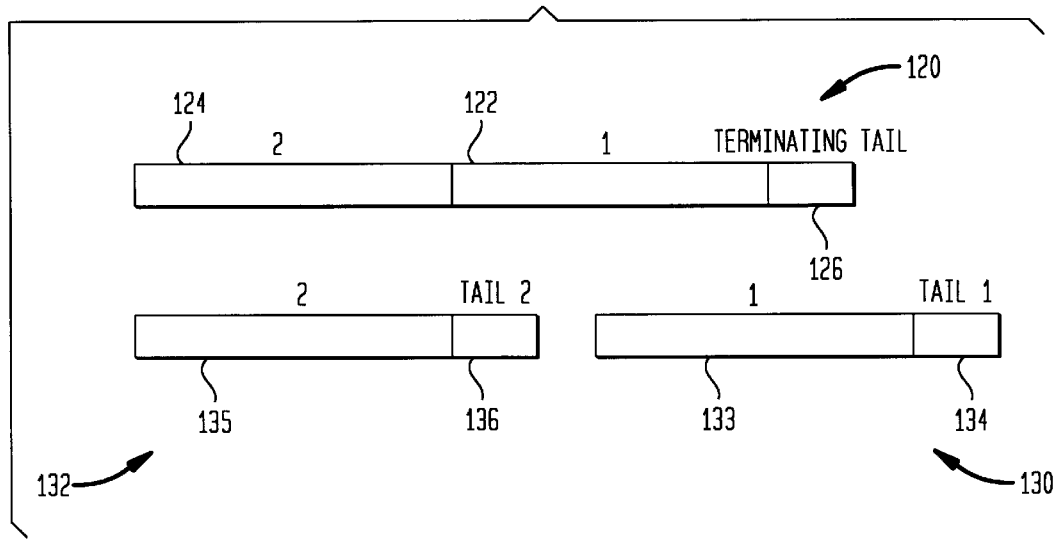
FIG. 7 illustrates the use of rate-compatible punctured convolutional (RCPC) codes in providing two-level UEP in accordance with the invention.

FIG. 7 illustrates the use of termination bits for use in conjunction with RCPC codes or other types of convolutional codes to provide two-level UEP in accordance with the invention. An exemplary codeword 120 includes a first level portion 122, a second level portion 124 and a single terminating tail 126. If the overhead due to the bits of the terminating tail 126 is negligible, the need for rate-compatible codes for the first and second levels is less urgent, and non-rate-compatible codes could be used. It is also possible to terminate each level code separately, as illustrated in the codewords 130 and 132 of FIG. 7. The codeword 130 includes a first level portion 133 and a terminating tail 134, while the codeword 132 includes a second level portion 135 and a separate terminating tail 136. The additional overhead for separate terminating tails in two-level UEP may still be negligible in many applications. The use of punctured convolutional codes allows the same basic decoder to be used for all codes derived from the same mother code.

As noted above, the use of Reed-Solomon codes permits an error detection flag for error mitigation to be obtained automatically from the decoder. In embodiments of the invention which make use of convolutional codes, a number of different techniques may be used to obtain an error detection flag for error mitigation. One possible technique is to utilize a generalized Viterbi algorithm, as described in, for example, N. Seshadri and C-E. W. Sundberg, "Generalized Viterbi Algorithms for Error Detection with Convolutional Codes," Conf. Rec. GLOBECOM '89, pp. 1534–1538, Dallas, Tex., November 1989, N. Seshadri and C-E. W. Sundberg, "List Viterbi Decoding Algorithms with Applications," IEEE Transactions on Communications, pp. 313–323, Vol. 42, No. 2/3/4, 1994, and C. Nill and C-E. W. Sundberg, "List and Soft Symbol Output Viterbi Algorithms: Extensions and Comparisons," IEEE Transactions on Communications, Vol. 43, No. 2/3/4, 1995, all of which are incorporated by reference herein. This technique generally requires no significant additional overhead beyond that already used in the convolutional code, but may require more frequent use of termination tails and more complex processing.

Figure 8:
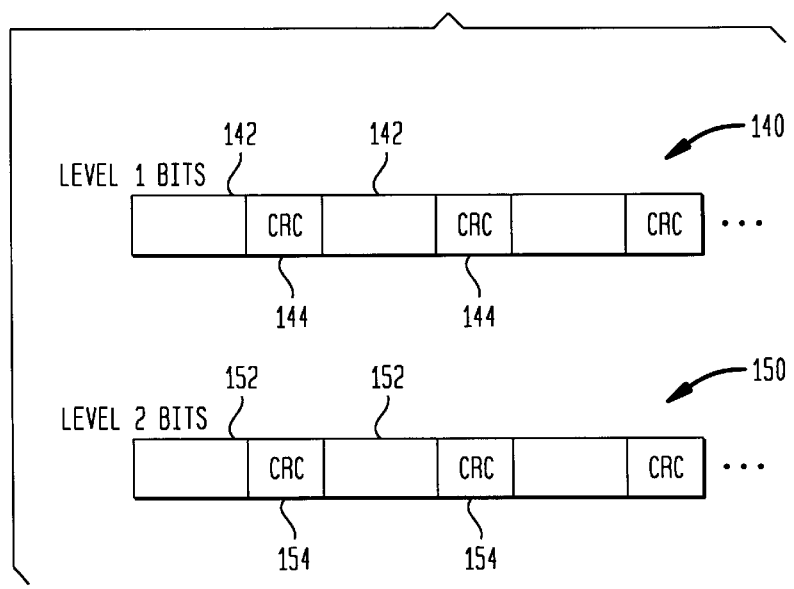
FIG. 8 illustrates the use of cyclic redundancy codes (CRC) in providing error mitigation in conjunction with a two-level UEP technique in accordance with the invention.

FIG. 8 illustrates a second possible technique for obtaining an error detection flag for use in error mitigation. This technique involves using a cyclic redundancy code (CRC) before the convolutional code. In accordance with this technique, CRC bits are inserted periodically in the PAC bitstream, and implemented separately for each level of error protection. As illustrated in FIG. 8, a set of first level bits 140 in the PAC audio bit stream includes groups of first level bits 142 interspersed with corresponding CRC bits 144. Similarly, a set of second level bits 150 in the PAC audio stream includes groups of second level bits 152 interspersed with corresponding CRC bits 154. This CRC technique has the advantage of being simple to implement and use. A third possible technique for obtaining an error detection flag for use in error mitigation is to use a high-rate Reed-Solomon code after the convolutional code. It should be noted that alternative techniques for generating an error detection flag, other than the three exemplary techniques described above, may also be used.

The above-described embodiments of the invention are intended to be illustrative only. For example, alternative embodiments of the invention may utilize block or convolutional codes other than the exemplary Reed-Solomon or RCPC codes described above. Moreover, techniques other than coding may be used to provide different levels of error protection. In addition, the techniques of the invention may be used to provide any number of different levels of UEP for audio information, and may be used with a wide variety of different bit rates and transmission channels. Alternative embodiments can extend the illustrative two-level and three-level techniques described above to any desired number of levels in a straightforward manner. Other alternative embodiments can utilize any number of different multi-packet error protection profiles for processing segments of multiple audio packets. Further embodiments could use other techniques for providing an adaptive number of different levels of error protection in a given application. These and numerous other alternative embodiments and implementations within the scope of the following claims will be apparent to those skilled in the art.

What is claimed is:

1. A method of processing a stream of audio information bits for transmission in a communication system, the audio information bits including control bits and data its the method comprising the steps of:

separating the audio data bits into n different classes of audio data bits based on error sensitivity, where n is greater than or equal to two; and providing a different level of error protection for each of the n different classes of audio data bits;

wherein the separating step is applied to the audio data bits after an audio coding process has been applied to the audio data bits, the audio coding process including both a quantization operation and a variable length audio coding operation, and a given level of error protection is provided for a corresponding one of the classes using a fixed channel coding rate.

2. The method of claim 1 wherein the different levels of error protection include a first level of error protection for a first class of the data bits and a second level of error protection for a second class of the data bits.

3. The method of claim 1 wherein the providing step includes coding the control bits using a level of error protection higher than that used for any of the n classes of the data bits.

4. The method of claim 1 wherein a cumulative bit rate provided as a result of the providing step is substantially equivalent to that which would result if an equal level of error protection were provided for the control bits and each of the n classes of data bits.

5. The method of claim 2 wherein the providing step includes coding the control and data bits such that the control bits and the first class of data bits are both provided with the first level of error protection.

6. The method of claim 1 wherein at least a portion of the control bits from a current packet in the audio information bit stream are repeated in a subsequent packet of the audio information bit stream.

7. The method of claim 1 wherein the separating step includes separating the audio data bits into the n classes of data bits based on the impact of the data bits on perceived quality of an audio signal reconstructed from the audio information bits.

8. The method of claim 7 wherein the separating step includes separating the data bits such that data bits corresponding to a side audio channel are assigned to a class with a lower level of error protection than that of data bits corresponding to a center audio channel.

9. The method of claim 7 wherein the separating step includes separating the data bits such that data bits corresponding to a designated frequency range are assigned to a class with a higher level of error protection than that of data bits corresponding to another frequency range.

10. The method of claim 9 wherein the designated frequency range is approximately 100 Hz to 4 kHz.

11. The method of claim 1 wherein a packet of the stream of audio information bits has a length of K bits, and a first one of the n classes having a highest level of error protection is approximately of size P*K/100, where P is a fixed percentage of bits which will be assigned to the first class for multiple packets of the audio information bit stream.

12. The method of claim 11 wherein bits of the audio information bit stream are assigned a level of error protection in accordance with the following decreasing order of priority:

(a) the control bits;

(b) data bits corresponding to a center audio channel and a frequency range of about 100 Hz to 2.5 kHz;

(c) data bits corresponding to a center audio channel and a frequency range of about 2.5 kHz to 4 kHz.

(d) data bits corresponding to a difference channel in a frequency range of about 100 Hz to 4 kHz;

(e) data bits corresponding to a frequency range of about 0 to 100 Hz;

(f) data bits corresponding to a frequency range of about 4 to 8 kHz;

(g) data bits corresponding to a difference channel and a frequency range of about 4 to 8 kHz; and (h) data bits corresponding to frequencies greater than about 8 kHz.

13. The method of claim 1 further including the step of decoding coded classes of bits using a list Viterbi algorithm to obtain an error detection flag for use in error mitigation.

14. The method of claim 1 wherein the providing step further includes the step of inserting CRC bits periodically in the audio information bitstream, wherein the CRC bits are used to provide error detection for use in an error mitigation algorithm in a decoder.

15. The method of claim 1 wherein different levels of error protection are used for different groups of packets in the audio information bit stream.

16. An apparatus for use in processing audio information for transmission in a communication system, the apparatus comprising:

a classifier for receiving a stream of audio information bits, wherein the classifier is operative to separate the audio information bits into control bits and n different classes of data bits, where n is greater than or equal to two, and the audio data bits are separated into the classes based on error sensitivity of the audio data bits, and further wherein the separation of the audio data bits into the classes occurs after an audio coding process has been applied to the audio data bits, the audio coding process including both a quantization operation and a variable length audio coding operation; and at least n encoders, each of the n encoders receiving the data bits of one of the n classes, and coding the nth class of data bits so as to provide a corresponding one of n levels of error protection for that class of data bits, wherein a given level of error protection is provided for a corresponding one of the classes using a fixed channel coding rate.

17. The apparatus of claim 16 wherein the n different levels of error protection include a first level of error protection for a first class of the data bits and a second level of error protection for a second class of the data bits.

18. The apparatus of claim 16 further including an additional encoder for encoding the control bits using a level of error protection higher than that used for any of the n classes of the data bits.

19. The apparatus of claim 16 wherein one of the encoders is operative to encode the control bits and a given one of the classes of data bits such that both the control bits and the given class of data bits are both provided with the same level of error protection.

20. The apparatus of claim 16 wherein at least a portion of the control bits from a current packet in the audio information bit stream are repeated in a subsequent packet of the audio information bit stream.

21. The apparatus of claim 16 wherein the classifier is operative to separate the data bits into the n classes of data bits based on the impact of the data bits on perceived quality of an audio signal reconstructed from the audio information bits.

22. The apparatus of claim 21 wherein the classifier separates the data bits such that data bits corresponding to a side audio channel are assigned to a class with a lower level of error protection than that of data bits corresponding to a center audio channel.

23. The apparatus of claim 21 wherein the classifier separates the data bits such that data bits corresponding to designated frequency range are assigned to a class with a higher level of error protection than that of data bits corresponding to another frequency range.

24. The apparatus of claim 23 wherein the designated frequency range is approximately 100 Hz to 4 kHz.

25. The apparatus of claim 16 wherein a packet of the stream of audio information bits has a length of K bits, and a first one of the n classes having a highest level of error protection is approximately of size $P*K/100$, where P is a fixed percentage of bits which will be assigned to the first class for multiple packets of the audio information bit stream.

26. The apparatus of claim 16 wherein different levels of error protection are used for different groups of packets in the audio information bit stream.

27. An apparatus for use in decoding audio information received in a communication system, the apparatus comprising:

at least n decoders, wherein each of the n decoders is operative to decode a portion of a received audio signal to recover a corresponding portion of an audio information bit stream including control bits and n different classes of data bits, where n is greater than or equal to two, and each of the n classes of data bits has one of n levels of error protection, and further wherein separation of the audio data bits into the classes occurs after an audio coding process has been applied to the audio data bits, the audio coding process including both a quantization operation and a variable length audio coding operation, and a given level of error protection is provided for a corresponding one of the classes using a fixed channel coding rate; and a reconstruction unit which receives the portions of the audio information bit stream from the decoders and generates audio packets therefrom.

28. The apparatus of claim 27 further including an additional decoder for decoding a portion of the received signal corresponding to the control bits, wherein the control bits have a level of error protection higher than that used for any of the n classes of the data bits.

29. The apparatus of claim 27 wherein one of the n decoders is operative to decode a portion of the received signal corresponding to the control bits and a portion of the received signal corresponding to a given one of the classes of data bits, wherein both the control bits and the given class of data bits both have the same level of error protection.

30. A method of processing a stream of coded audio information bits for transmission in a communication system, the coded audio information bits including control bits and data bits, the method comprising the steps of:

separating the audio data bits into n different classes of audio data bits based on error sensitivity, where n is greater than or equal to two, and each of at least a subset of the classes is configured so as to include audio data bits corresponding to designated non-contiguous bands of an audio frequency spectrum; and providing a different level of error protection for each of the n different classes of audio data bits.

31. An apparatus for use in processing audio information for transmission in a communication system, the apparatus comprising:

a classifier for receiving a stream of audio information bits, wherein the classifier is operative to separate the audio information bits into control bits and n different classes of data bits, where n is greater than or equal to two, and the data bits are separated into the classes based on error sensitivity of the data bits, and each of at least a subset of the classes is configured so as to include audio data bits corresponding to designated non-contiguous bands of an audio frequency spectrum; and at least n encoders, each of the n encoders receiving the data bits of one of the n classes, and coding the nth class of data bits so as to provide a corresponding one of n levels of error protection for that class of data bits.

32. An apparatus for use in decoding audio information received in a communication system, the apparatus comprising:

at least n decoders, wherein each of the n decoders is operative to decode a portion of a received audio signal to recover a corresponding portion of an audio information bit stream including control bits and n different classes of data bits, where n is greater than or equal to two, and each of the n classes of data bits has one of n levels of error protection, and each of at least a subset of the classes is configured so as to include audio data bits corresponding to designated noncontiguous bands of an audio frequency spectrum; and a reconstruction unit which receives the portions of the audio information bit stream from the decoders and generates audio packets therefrom.

33. A method of processing a stream of coded audio information bits for transmission in a communication system, the coded audio information bits including control bits and data bits, the method comprising the steps of:

separating the audio data bits into n different classes of audio data bits based on error sensitivity, where n is greater than or equal to two; and providing a different level of error protection for each of the n different classes of audio data bits, wherein the different levels of error protection are provided for a first portion of the audio data bits in accordance with a first multipacket error protection profile and are provided for a second portion of the audio data bits in accordance with a second multipacket error protection profile different than the first error protection profile.

34. An apparatus for use in processing audio information for transmission in a communication system, the apparatus comprising:

a classifier for receiving a stream of audio information bits, wherein the classifier is operative to separate the audio information bits into control bits and n different classes of data bits, where n is greater than or equal to two, and the data bits are separated into the classes based on error sensitivity of the data bits; and at least n encoders, each of the n encoders receiving the data bits of one of the n classes, and coding the nth class of data bits so as to provide a corresponding one of n levels of error protection for that class of data bits, wherein the different levels of error protection are provided for a first portion of the audio data bits in accordance with a first multipacket error protection profile and are provided for a second portion of the audio data bits in accordance with a second multipacket error protection profile different than the first error protection profile.

35. An apparatus for use in decoding audio information received in a communication system, the apparatus comprising:

at least n decoders, wherein each of the n decoders is operative to decode a portion of a received audio signal to recover a corresponding portion of an audio information bit stream including control bits and n different classes of data bits, where n is greater than or equal to two, and each of the n classes of data bits has one of n levels of error protection, wherein the different levels of error protection are provided for a first portion of the audio data bits in accordance with a first multipacket error protection profile and are provided for a second portion of the audio data bits in accordance with a second multipacket error protection profile different than the first error protection profile; and a reconstruction unit which receives the portions of the audio information bit stream from the decoders and generates audio packets therefrom.

* * * * *

UNITED STATES PATENT AND TRADEMARK OFFICE
CERTIFICATE OF CORRECTION

PATENT NO. : 6,405,338 B1
DATED : June 11, 2002
INVENTOR(S) : Sinha et al.

It is certified that error appears in the above-identified patent and that said Letters Patent is hereby corrected as shown below:

Column 13,
Line 30, please replace "the nth class" with -- said one of the n classes --.

Column 15,
Line 2, please replace "the nth class" with -- said one of the n classes --.

Column 16,
Line 8, please replace "the nth class" with -- said one of the n classes --.

Signed and Sealed this

Tenth Day of September, 2002

Attest:

JAMES E. ROGAN
Attesting Officer  Director of the United States Patent and Trademark Office